(12) United States Patent
Gan

(10) Patent No.: US 11,067,729 B2
(45) Date of Patent: Jul. 20, 2021

(54) METHOD FOR MANUFACTURING COLOR RESIST

(71) Applicant: Shenzhen China Star Optoelectronics Technology Co., Ltd., Guangdong (CN)

(72) Inventor: Qiming Gan, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 477 days.

(21) Appl. No.: 15/539,739

(22) PCT Filed: May 2, 2017

(86) PCT No.: PCT/CN2017/082747
§ 371 (c)(1),
(2) Date: Jun. 26, 2017

(87) PCT Pub. No.: WO2018/188134
PCT Pub. Date: Oct. 18, 2018

(65) Prior Publication Data
US 2019/0391305 A1 Dec. 26, 2019

(30) Foreign Application Priority Data

Apr. 12, 2017 (CN) .......................... 201710236026.X

(51) Int. Cl.
*G02B 5/20* (2006.01)

(52) U.S. Cl.
CPC .................................... *G02B 5/201* (2013.01)

(58) Field of Classification Search
None
See application file for complete search history.

(56) References Cited

U.S. PATENT DOCUMENTS

| 2015/0378071 A1* | 12/2015 | Wang | G02B 5/201 |
| | | | 359/891 |
| 2017/0102582 A1* | 4/2017 | Li | G02F 1/1339 |
| 2017/0115526 A1 | 4/2017 | Xiong | |
| 2017/0192143 A1 | 7/2017 | Xiong et al. | |

FOREIGN PATENT DOCUMENTS

| CN | 101609227 A | 12/2009 |
| CN | 103969873 A | 8/2014 |
| CN | 104317158 A | 1/2015 |
| KR | 20070025155 A | 3/2007 |

* cited by examiner

*Primary Examiner* — James M Mellott

(57) ABSTRACT

A method for manufacturing a color resist is disclosed. According to the method, a mask is moved so that an alignment mark is aligned with marks of a black matrix layer respectively. Each color resist and a corresponding color block are formed on the black matrix layer by the mask, and a position of each color resist is checked according to a positional relationship between a corresponding color block and hollowed-out region. A distance between a first mark and a second mark and a distance between a first mark and a third mark are configured in such manner that the color blocks do not overlap with one another. Therefore, the color blocks do not overlap with one another while a size thereof does not change.

20 Claims, 6 Drawing Sheets ously, and thus the positional error among the color resists cannot be measured; and if the color blocks are made with a smaller size, there is a peeling off risk.

METHOD FOR MANUFACTURING COLOR RESIST

CROSS REFERENCE TO RELATED APPLICATION

The present application claims priority of Chinese patent application CN201710236026.X, entitled "Method for Manufacturing Color Resist" and filed on Apr. 12, 2017, the entirety of which is incorporated herein by reference.

FIELD OF THE INVENTION

The present disclosure relates to the technical field of color filter substrate manufacturing, and particularly to a method for manufacturing a color resist.

BACKGROUND OF THE INVENTION

During manufacturing of a color resist at present, the color resist and a corresponding checking color block are manufactured through one same mask so as to reduce a number of masks and a manufacturing cost thereof.

In a procedure when the color resist is manufactured, a black matrix mask is used for forming alignment marks on a substrate. FIG. 1 schematically shows alignment marks in the prior art. As shown in FIG. 1, the alignment marks comprise alignment marks 101 and an alignment mark 102, wherein the alignment marks 101 are arranged on a black matrix of a glass substrate, and the alignment mark 102 are arranged on a RGB mask.

The alignment marks 101 specifically comprise three black matrix alignment marks, wherein a first black matrix alignment mark and a second black matrix alignment mark are spaced from each other by a width H of one sub pixel, and the first black matrix alignment mark and a third black matrix alignment mark are spaced from each other by 2*H, i.e., a width of two sub pixels. The RGB mask is moved, and when the alignment mark 102 of the RGB mask is aligned with each of the black matrix alignment marks 101, a color block and a color resist can be formed at a position corresponding to each of the black matrix alignment marks 101. FIG. 2 schematically shows a first kind of alignment checking mark in the prior art. As shown in FIG. 2, the alignment checking mark comprises an R color block 201, a G color block 202, and a B color block 203. The R color block 201 and the G color block 202 are spaced from each other by H, and the R color block 201 and the B color block 203 are spaced from each other by 2*H.

FIG. 3 schematically shows a second kind of alignment checking mark in the prior art. As shown in FIG. 3, under a high PPI (pixels per inch) mode (i.e., a high pixel density mode, pixels having a small size under this mode), H is less than a width C of a color block. At this time, an R color block 201 and a G color block 202 will overlap with each other, and thus it will cause a problem that a positional error among the color resists cannot be measured.

FIG. 4 schematically shows a third kind of alignment checking mark in the prior art. As shown in FIG. 4, in order to enable that the color blocks do not overlap with each other, the color blocks can be made with a smaller size. However, since the color blocks have a smaller size, there is a peeling off risk.

The technical defect of the method for manufacturing the color resist in the prior art lies in that: when the width of one sub pixel is less than the width of the color block under the high PPI mode, the color blocks will overlap with one

SUMMARY OF THE INVENTION

In order to solve the aforesaid technical problem, the present disclosure provides a method for manufacturing a color resist, which comprises steps of:

forming a black matrix layer on a substrate, wherein the black matrix layer comprises a first mark, a second mark, a third mark, a first hollowed-out region, a second hollowed-out region, and a third hollowed-out region;

moving a mask so as to enable an alignment mark of the mask to be aligned with the first mark, forming a first color resist and a first color block on the black matrix layer by the mask, and checking a position of the first color resist according to a positional relationship between the first color block and the first hollowed-out region;

moving the mask so as to enable the alignment mark to be aligned with the second mark, forming a second color resist and a second color block on the black matrix layer by the mask, and checking a position of the second color resist according to a positional relationship between the second color block and the second hollowed-out region; and moving the mask so as to enable the alignment mark to be aligned with the third mark, forming a third color resist and a third color block on the black matrix layer by the mask, and checking a position of the third color resist according to a positional relationship between the third color block and the third hollowed-out region, wherein the first mark/the first hollowed-out region and the second mark/the second hollowed-out region are spaced from each other by a first distance, and the first mark/the first hollowed-out region and the third mark/the third hollowed-out region are spaced from each other by a second distance; and wherein the first distance and the second distance are configured in such a manner that the first color block, the second color block, and the third color block do not overlap with one another.

According to one embodiment, the first distance $H_1$ meets $H_1=(3*n_1+1)*P$, $n_1$ being an integer, $n_1 \geq 1$ or $n_1 \leq -1$, and P being a width of a sub pixel; and the second distance $H_2$ meets $H_2=(3*n_2+2)*P$, $n_2$ being an integer, and $n_2 \geq 0$ or $n_2 \leq -2$.

According to one embodiment, the first mark, the second mark, the third mark, the first hollowed-out region, the second hollowed-out region, and the third hollowed-out region are formed simultaneously by one same mask.

According to one embodiment, the first color resist, the second color resist, and the third color resist are different from one another, and are respectively one selected from a group consisting of a red color resist, a green color resist, and a blue color resist.

According to one embodiment, the first color block, the second color block, and the third color block are arranged at a position between two adjacent sub pixels.

According to one embodiment, the first mark, the second mark, and the third mark are all arranged in a non-active area.

According to one embodiment, the method further comprises steps of:

enabling the black matrix layer to have a fourth mark and a fourth hollowed-out region when forming the black matrix layer; and moving the mask so as to enable the alignment mark of the mask to be aligned with the fourth mark, forming a fourth color resist and a fourth color block on the black matrix layer by the mask, and checking a position of the fourth color resist according to a positional relationship between the fourth color block and the fourth hollowed-out region, wherein the first mark/the first hollowed-out region and the fourth mark/the fourth hollowed-out region are spaced from each other by a third distance; and wherein the first distance, the second distance, and the third distance are configured in such a manner that the first color block, the second color block, the third color block, and the fourth color block do not overlap with one another.

According to one embodiment, the first distance $H_1$ meets $H_1=(4*n_1+1)*P$, $n_1$ being an integer, $n_1 \geq 1$ or $n_1 \leq -1$, and P being a width of a sub pixel;

the second distance $H_2$ meets $H_2=(4*n_2+2)*P$, $n_2$ being an integer, and $n_2 \geq 0$ or $n_2 \leq -2$; and the third distance $H_3$ meets $H_3=(4*n_3+3)*P$, $n_3$ being an integer, and $n_3 \geq 0$ or $n_3 \leq -2$.

According to one embodiment, the first color resist, the second color resist, the third color resist, and the fourth color resist are different from one another, and are respectively one selected from a group consisting of a red color resist, a green color resist, a blue color resist, and a white color resist.

According to one embodiment, the first color block, the second color block, the third color block, and the fourth color block are arranged at a position between two adjacent sub pixels.

Compared with the prior art, one embodiment or a plurality of embodiments according to the present disclosure may have the following advantages or beneficial effects.

In the method for manufacturing the color resist according to the present disclosure, the mask is moved so that the alignment mark is aligned with the first mark, the second mark, and the third mark respectively. The first color resist and the first color block corresponding to the first mark, the second color resist and the second color block corresponding to the second mark, and the third color resist and the third color block corresponding to the third mark are formed on the black matrix layer by the mask. The first mark and the second mark are spaced from each other by the first distance, and the first mark and the third mark are spaced from each other by the second distance. The first distance and the second distance are configured in such a manner that the first color block, the second color block, and the third color block do not overlap with one another. In this manner, the color blocks do not overlap with one another while a size thereof does not change.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

Embodiment 1

The present embodiment will be illustrated below taking a method for manufacturing a color resist which comprises three sub pixels as an example.

Figure 1:
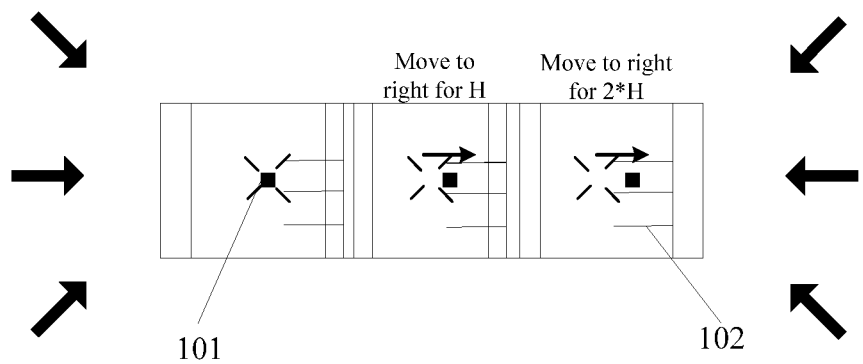
FIG. 1 schematically shows alignment marks in the prior art.
Figure 2:
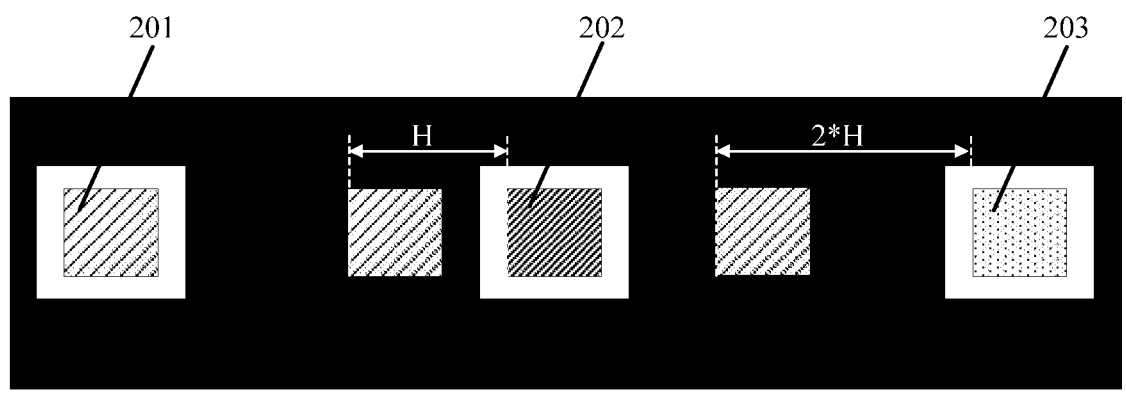
FIG. 2 schematically shows a first kind of alignment checking mark in the prior art.
Figure 3:
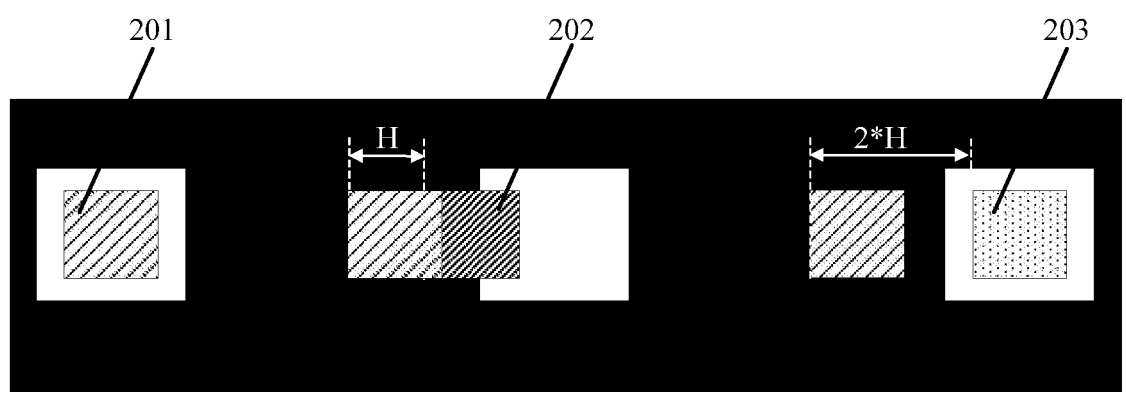
FIG. 3 schematically shows a second kind of alignment checking mark in the prior art.
Figure 4:
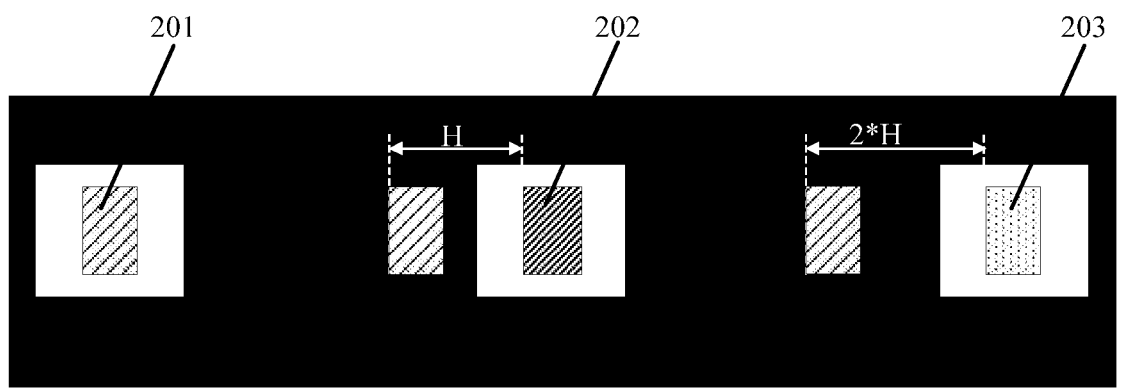
FIG. 4 schematically shows a third kind of alignment checking mark in the prior art.
Figure 5:
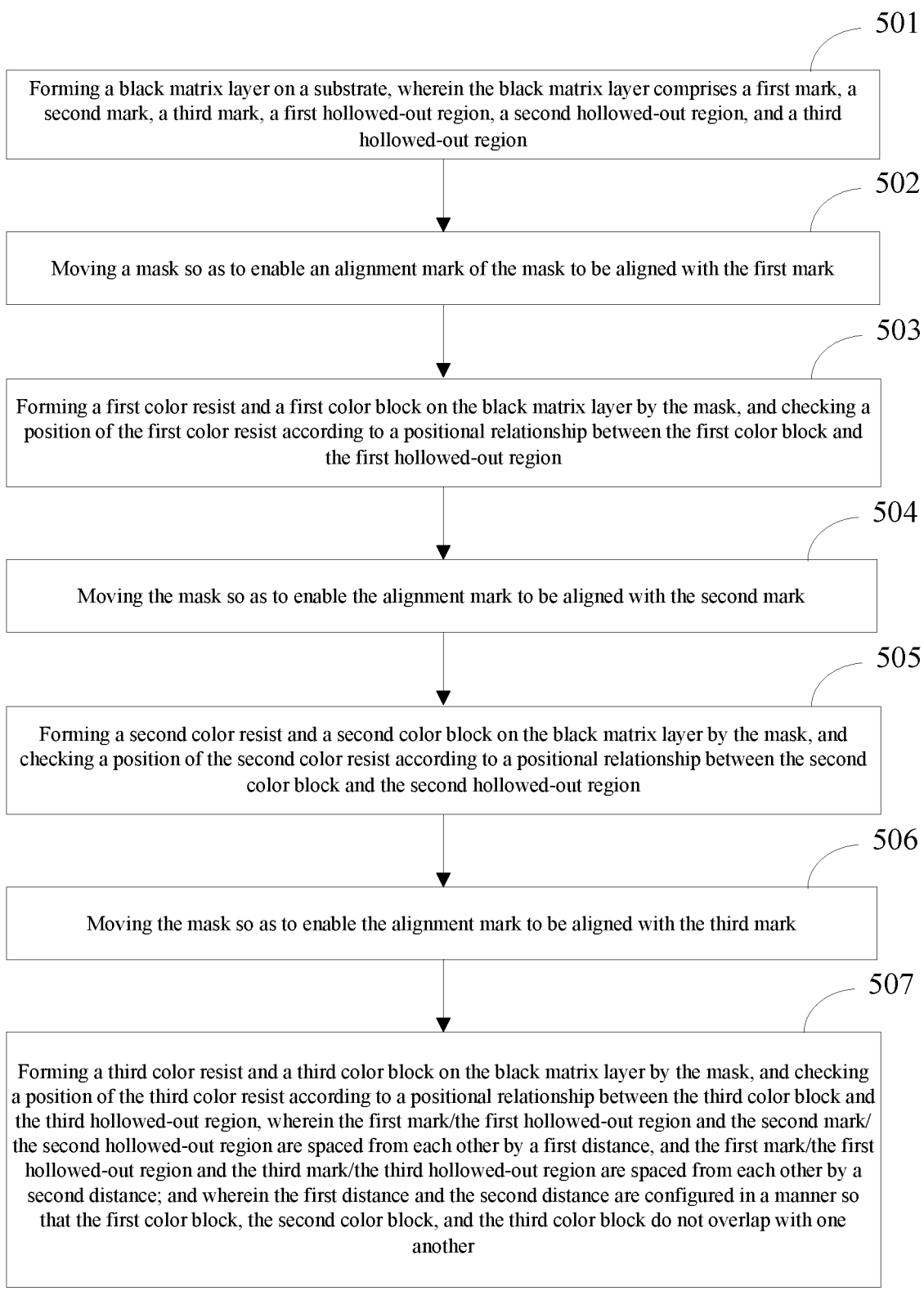
FIG. 5 is a flow chart of a method for manufacturing a color resist according to embodiment 1 of the present disclosure.

FIG. 5 is a flow chart of a method for manufacturing a color resist according to embodiment 1 of the present disclosure. As shown in FIG. 5, the method comprises steps S510 to S570.

In steps S510 to S570, color resists can be manufactured only by two masks. The two masks comprise a black matrix mask and a color resist mask. The black matrix mask comprises a pattern of alignment marks (i.e., a first mark, a second mark, and a third mark) and a pattern of hollowed-out regions (i.e., a first hollowed-out region, a second hollowed-out region, and a third hollowed-out region). The color resist mask comprises a pattern of an alignment mark, a pattern of alignment checking marks (i.e., a first color block, a second color block, and a third color block), and a pattern of color resists (i.e., a first color resist, a second color resist, and a third color resist).

In step S510, a black matrix layer is formed on a substrate. The black matrix layer comprises a first mark 601, a second mark 602, and a third mark 603 as shown in FIG. 6, as well as a first hollowed-out region 701, a second hollowed-out region 702, and a third hollowed-out region 703 as shown in FIG. 7.

Preferably, the first mark 601, the second mark 602, the third mark 603, the first hollowed-out region 701, the second hollowed-out region 702, and the third hollowed-out region 703 are formed simultaneously by one same mask. The mask referred to herein is the black matrix mask. The first mark 601, the second mark 602, and the third mark 603 are formed on a substrate, for example a glass substrate by the pattern of the alignment marks of the black matrix mask. At the same time, the first hollowed-out region 701, the second hollowed-out region 702, and the third hollowed-out region 703 are formed on the substrate by the pattern of the hollowed-out regions.

Preferably, the first mark 601, the second mark 602, and the third mark 603 are all arranged in a non-active area. In this manner, normal display of a liquid crystal display panel will not be affected, and an aperture ratio thereof will not be affected. The first hollowed-out region 701, the second hollowed-out region 702, and the third hollowed-out region 703 are all arranged in an active area. Specifically, the first hollowed-out region 701, the second hollowed-out region 702, and the third hollowed-out region 703 each are arranged at a position between two adjacent sub pixels.

Figure 6:
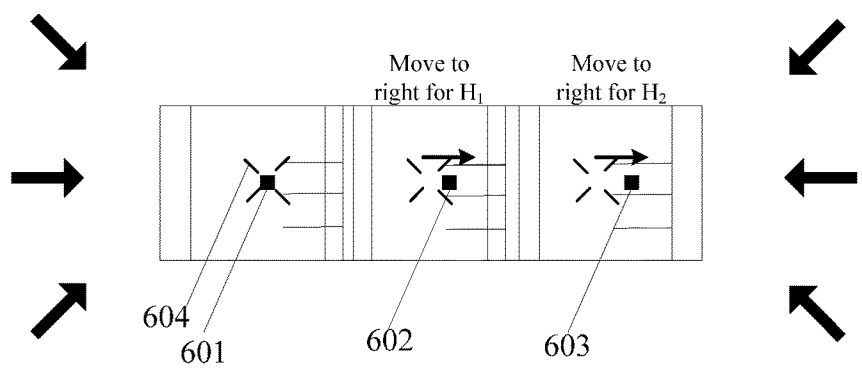
FIG. 6 schematically shows alignment marks according to embodiment 1 of the present disclosure.
Figure 7:
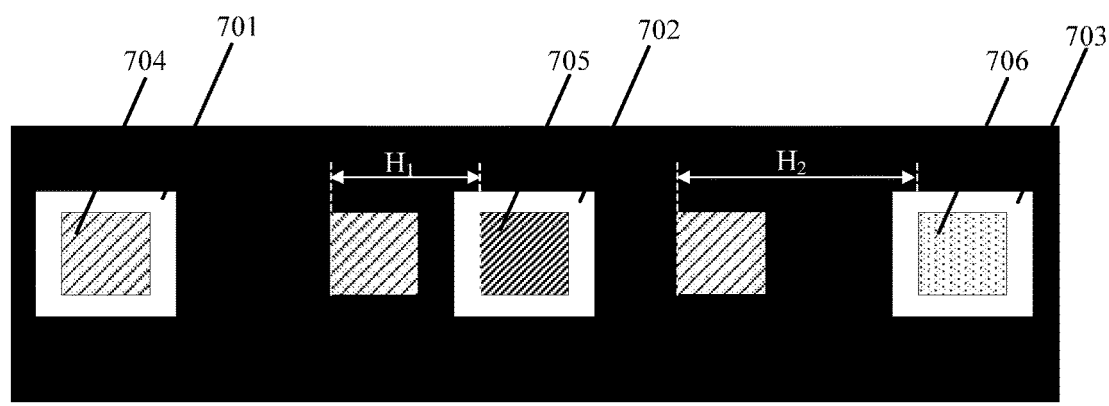
FIG. 7 schematically shows alignment checking marks according to embodiment 1 of the present disclosure.

In step S520, a mask is moved so that an alignment mark 604 of the mask as shown in FIG. 6 is aligned with the first mark 601. The mask referred to herein is the color resist mask. The alignment mark 604 of the color resist mask is aligned with the first mark 601, and thus positioning of the color resist mask is completed. Then, step S530 is gone to.

Figure 8:
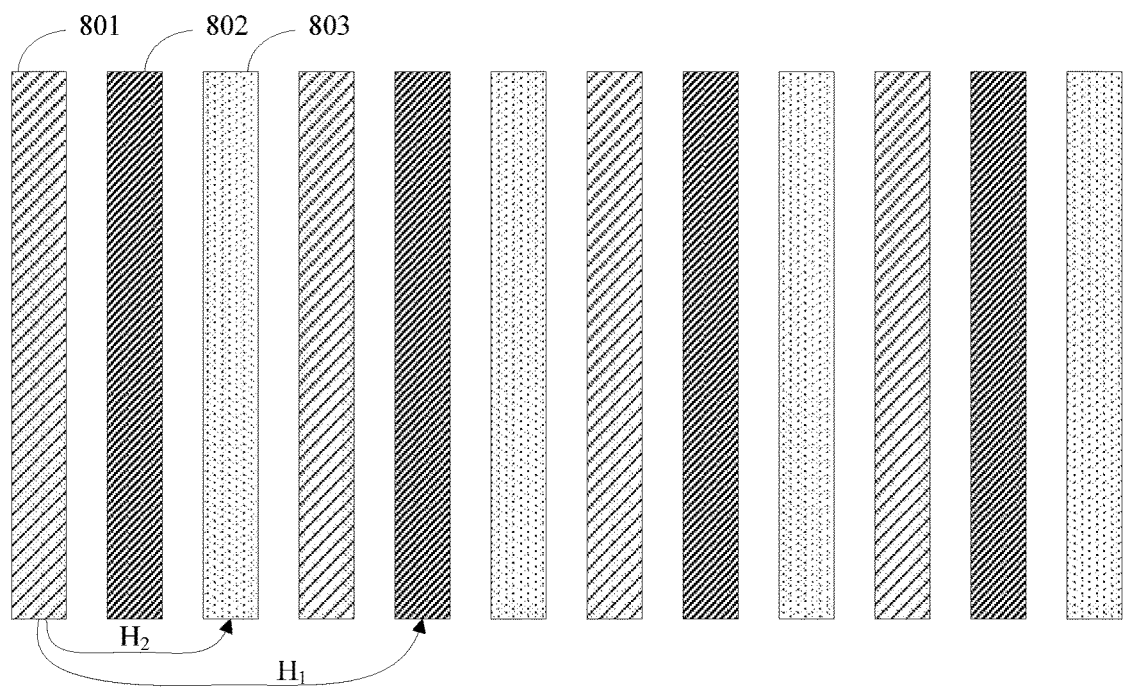
FIG. 8 schematically shows color resists formed according to embodiment 1 of the present disclosure.

In step S530, a first color resist 801 as shown in FIG. 8 and a first color block 704 as shown in FIG. 7 are formed on the black matrix layer by the color resist mask, and a position of the first color resist 801 is checked according to a positional relationship between the first color block 704 and the first hollowed-out region 701.

Specifically, the first color block 704 is formed on the black matrix layer by the pattern of the alignment checking marks of the color resist mask. At the same time, the first color resist 801 is formed on the black matrix layer by the pattern of the color resists of the color resist mask.

Since the first color block 704 and the first color resist 801 are formed by one mask, a position of the first color resist 801 can be checked through observing a positional error of the first color block 704. Specifically, as shown in FIG. 7, the position of the first color resist 801 can be checked through observing whether the first color block 704 is positioned at a center of the first hollowed-out region 701. If the position of the first color resist 801 is correct, the first color block 704 formed therein is exactly at a center of the first hollowed-out region 701.

In step S540, the color resist mask is moved so that the alignment mark 604 aligned with the second mark 602. The alignment mark 604 of the color resist mask is aligned with the second mark 602, and thus positioning of the color resist mask is completed. Then, step S550 is gone to.

In step S550, a second color resist 802 as shown in FIG. 8 and a second color block 705 as shown in FIG. 7 are formed on the black matrix layer by the color resist mask, and a position of the second color resist 802 is checked according to a positional relationship between the second color block 705 and the second hollowed-out region 702.

Specifically, the second color block 705 is formed on the black matrix layer by the pattern of the alignment checking marks of the color resist mask. At the same time, the second color resist 802 is formed on the black matrix layer by the pattern of the color resists of the color resist mask. The position of the second color resist 802 can be checked through observing whether the second color block 705 is positioned at a center of the second hollowed-out region 702. If the position of the second color resist 802 is correct, the second color block 705 formed therein is exactly at a center of the second hollowed-out region 702.

In step S560, the color resist mask is moved so that the alignment mark 604 aligned with the third mark 603. The alignment mark 604 of the color resist mask is aligned with the third mark 603, and thus positioning of the color resist mask is completed. Then, step S570 is gone to.

In step S570, a third color resist 803 as shown in FIG. 8 and a third color block 706 as shown in FIG. 7 are formed on the black matrix layer by the color resist mask, and a position of the third color resist 803 is checked according to a positional relationship between the third color block 706 and the third hollowed-out region 703.

Specifically, the third color block 706 is formed on the black matrix layer by the pattern of the alignment checking marks of the color resist mask. At the same time, the third color resist 803 is formed on the black matrix layer by the pattern of the color resists of the color resist mask. The position of the third color resist 803 can be checked through observing whether the third color block 706 is positioned at a center of the third hollowed-out region 703. If the position of the third color resist 803 is correct, the third color block 706 formed therein is exactly at a center of the third hollowed-out region 703.

According to the present embodiment, the first mark 601 and the second mark 602 are spaced from each other by a first distance, and the first mark 601 and the third mark 603 are spaced from each other by a second distance. The first hollowed-out region 701 and the second hollowed-out region 702 are spaced from each other by a first distance, and the first hollowed-out region 701 and the third hollowed-out region 703 are spaced from each other by a second distance. More importantly, the first distance and the second distance are configured in such a manner that the first color block 704, the second color block 705, and the third color block 706 do not overlap with one another.

Preferably, the first color block 704, the second color block 705, and the third color block 706 each are arranged at a position between two adjacent sub pixels.

In the method for manufacturing color resist according to the present embodiment, in step S520, step S540, and step S560, the color resist mask is moved so that the alignment mark 604 is aligned with the first mark 601, the second mark 602, and the third mark 603 respectively. Therefore, theoretically, the first color block 704 formed in step S530 and the second color block 705 formed in step S550 are spaced from each other by the first distance, and the first color block 704 formed in step S530 and the third color block 706 formed in step S570 are spaced from each other by the second distance. The first distance and the second distance are configured in a reasonable manner so that the first color block 704, the second color block 705, and the third color block 706 do not overlap with one another while the size of the color blocks does not change.

According to the present embodiment, the first distance and the second distance are configured as follows.

Specifically, the first distance $H_1$ meets $H_1=(3*n_1+1)*P$, $n_1$ being an integer, $n_1 \geq 1$ or $n_1 \leq -1$, and P being a width of a sub pixel. The second distance $H_2$ meets $H_2=(3*n_2+2)*P$, $n_2$ being an integer, $n_2 \geq 0$ or $n_2 \leq -2$, and P being a width of a sub pixel.

It should be noted that, when $n_1$ is an integer larger than or equal to 1, and $n_2$ is an integer larger than or equal to 0, the color resist mask is moved rightwards. When $n_1$ is an integer less than or equal to −1, and $n_2$ is an integer less than or equal to −2, the color resist mask is moved leftwards.

Specifically, as shown in FIG. 8, when $n_1$=1 and $n_2$=0, it can be obtained that $H_1$=4*P and $H_2$=2*P. That is, after the color resist mask is initially positioned to form the first color resist 801 and the first color block 704, the color resist mask is moved rightwards from an initial position to the second mark 602 (i.e., the color resist mask is moved rightwards for a distance four times the width of a sub pixel) to form the second color resist 802 and the second color block 705, and then the color resist mask is moved rightwards from an initial position to the third mark 603 (i.e., the color resist mask is moved rightwards for a distance two times the width of a sub pixel) to form the third color resist 803 and the third color block 706. The first color block 704 and the second color block 705 are spaced from each other by a distance four times the width of a sub pixel, and the first color block 704 and the third color block 706 are spaced from each other by a distance two times the width of a sub pixel. The first color block 704, the second color block 705, and the third color block 706 do not overlap with one another.

Selectively, when $n_1$=1 and $n_2$=2, it can be obtained that $H_1$=4*P and $H_2$=8*P. At this time, the first color block 704 and the second color block 705 are spaced from each other by a distance four times the width of a sub pixel, and the first color block 704 and the third color block 706 are spaced from each other by a distance eight times the width of a sub pixel. It can be seen that, the first color block 704, the second color block 705, and the third color block 706 do not overlap with one another.

Preferably, the first color resist 801, the second color resist 802, and the third color resist 803 are different from one another, and are respectively one selected from a group consisting of a red color resist, a green color resist, and a blue color resist. For example, the first color resist 801 is a red color resist, the second color resist 802 is a green color resist, and the third color resist 803 is a blue color resist.

In the method for manufacturing the color resist according to the present embodiment, the mask is moved so that the alignment mark 604 is aligned with the first mark 601, the second mark 602, and the third mark 603 respectively. The first color resist 801 and the first color block 704 corresponding to the first mark 601, the second color resist 802 and the second color block 705 corresponding to the second mark 602, and the third color resist 803 and the third color block 706 corresponding to the third mark 603 are formed on the black matrix layer by the mask. The first mark 601 and the second mark 602 are spaced from each other by the first distance, and the first mark 601 and the third mark 603 are spaced from each other by the second distance. The first distance and the second distance are configured in such a manner that the first color block 704, the second color block 705, and the third color block 706 do not overlap with one another. In this manner, the color blocks do not overlap with one another while a size thereof does not change, whereby the technical problem in the prior art that the color blocks overlap with each other or there is a peeling off risk for the color blocks can be solved.

Embodiment 2

The present embodiment will be illustrated below taking a method for manufacturing a color resist which comprises four sub pixels as an example.

Figure 9:
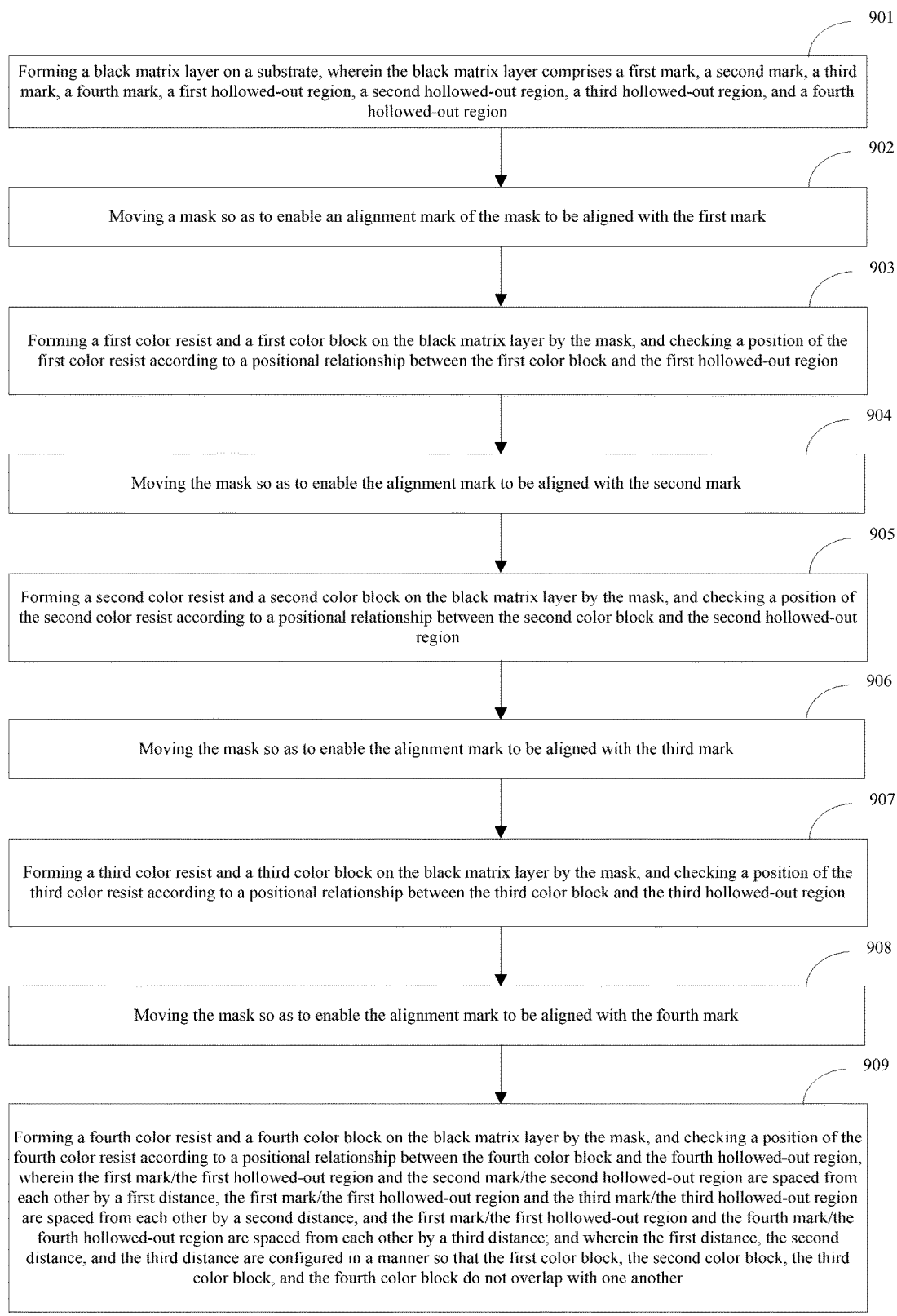
FIG. 9 is a flow chart of a method for manufacturing a color resist according to embodiment 2 of the present disclosure.

FIG. 9 is a flow chart of a method for manufacturing a color resist according to embodiment 2 of the present disclosure. As shown in FIG. 9, the method comprises steps S910 to S990.

Similar to embodiment 1, in steps S910 to S990, color resists can also be manufactured only by two masks. The two masks comprise a black matrix mask and a color resist mask. The black matrix mask comprises a pattern of alignment marks (i.e., a first mark, a second mark, a third mark and a fourth mark) and a pattern of hollowed-out regions (i.e., a first hollowed-out region, a second hollowed-out region, a third hollowed-out region, and a fourth hollowed-out region). The color resist mask comprises a pattern of an alignment mark, a pattern of alignment checking marks (i.e., a first color block, a second color block, a third color block, and a fourth color block), and a pattern of color resists (i.e., a first color resist, a second color resist, a third color resist, and a fourth color resist).

In step S910, a black matrix layer is formed on a substrate. The black matrix layer comprises a first mark 601, a second mark 602, a third mark 603, and a fourth mark 1001 as shown in FIG. 10, as well as a first hollowed-out region 701, a second hollowed-out region 702, a third hollowed-out region 703, and a fourth hollowed-out region 1101 as shown in FIG. 11.

Figure 10:
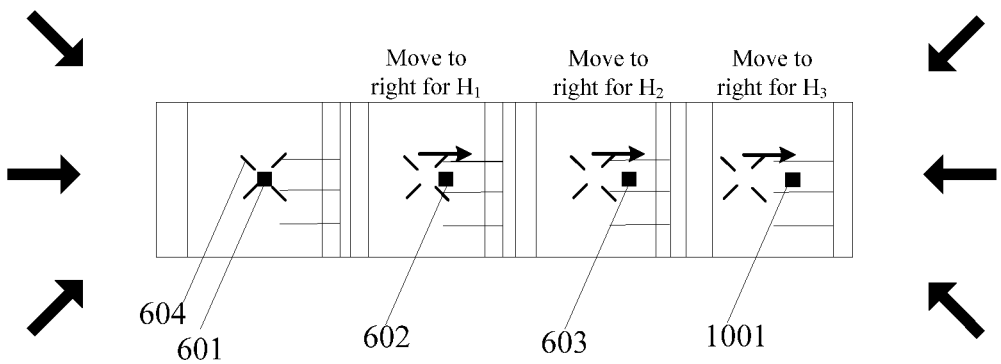
FIG. 10 schematically shows alignment marks according to embodiment 2 of the present disclosure.

In step S920, a mask is moved so that an alignment mark 604 of the mask as shown in FIG. 10 is aligned with the first mark 601. The mask referred to herein is the color resist mask. The alignment mark 604 of the color resist mask is aligned with the first mark 601, and thus positioning of the color resist mask is completed. Then, step S930 is gone to.

Figure 11:
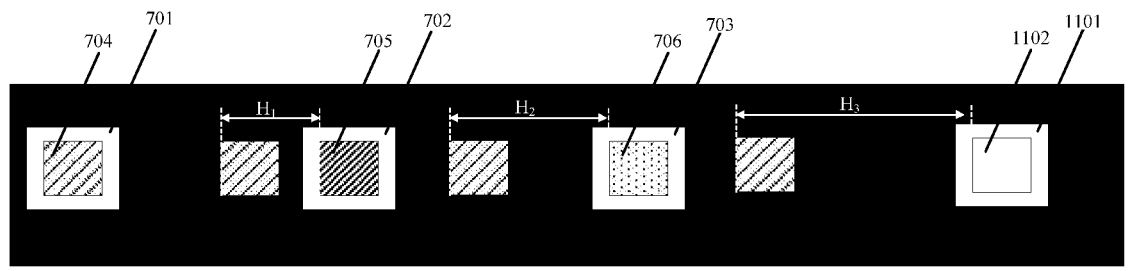
FIG. 11 schematically shows alignment checking marks according to embodiment 2 of the present disclosure.
Figure 12:
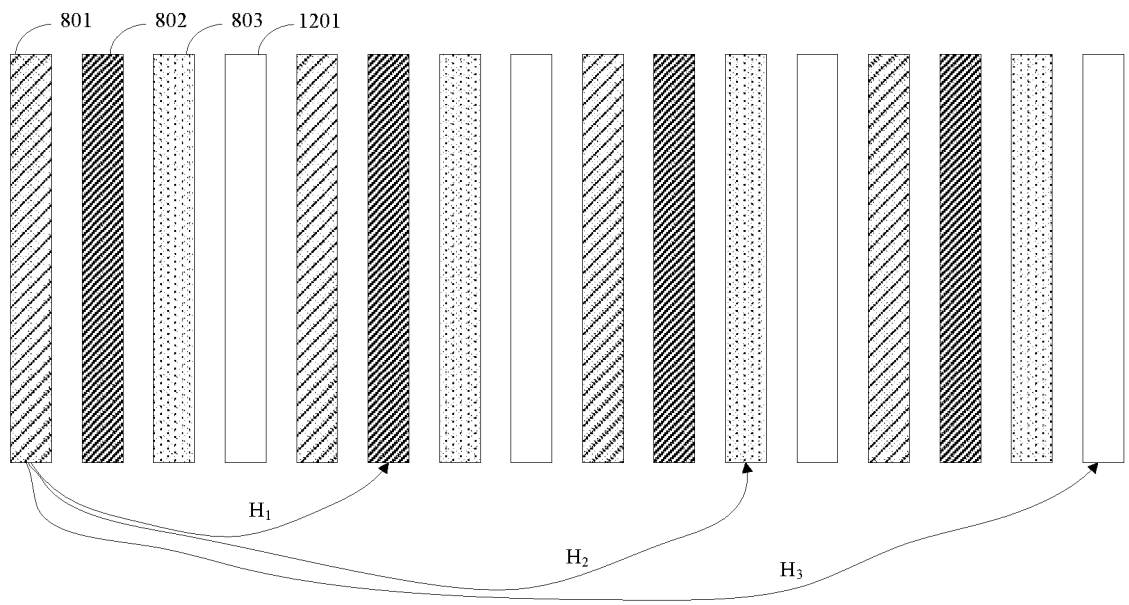
FIG. 12 schematically shows color resists formed according to embodiment 2 of the present disclosure.

In step S930, a first color resist 801 as shown in FIG. 12 and a first color block 704 as shown in FIG. 11 are formed on the black matrix layer by the color resist mask, and a position of the first color resist 801 is checked according to a positional relationship between the first color block 704 and the first hollowed-out region 701.

Specifically, the first color block 704 is formed on the black matrix layer by the pattern of the alignment checking marks of the color resist mask. At the same time, the first color resist 801 is formed on the black matrix layer by the pattern of the color resists of the color resist mask.

Since the first color block 704 and the first color resist 801 are formed by one mask, a position of the first color resist 801 can be checked through observing a positional error of the first color block 704. Specifically, as shown in FIG. 11, the position of the first color resist 801 can be checked through observing whether the first color block 704 is positioned at a center of the first hollowed-out region 701. If the position of the first color resist 801 is correct, the first color block 704 formed therein is exactly at a center of the first hollowed-out region 701.

In step S940, the color resist mask is moved so that the alignment mark 604 aligned with the second mark 602. The alignment mark 604 of the color resist mask is aligned with the second mark 602, and thus positioning of the color resist mask is completed. Then, step S950 is gone to.

In step S950, a second color resist 802 as shown in FIG. 12 and a second color block 705 as shown in FIG. 11 are formed on the black matrix layer by the color resist mask, and a position of the second color resist 802 is checked according to a positional relationship between the second color block 705 and the second hollowed-out region 702.

Specifically, the second color block 705 is formed on the black matrix layer by the pattern of the alignment checking marks of the color resist mask. At the same time, the second color resist 802 is formed on the black matrix layer by the pattern of the color resists of the color resist mask. The position of the second color resist 802 can be checked through observing whether the second color block 705 is positioned at a center of the second hollowed-out region 702. If the position of the second color resist 802 is correct, the second color block 705 formed therein is exactly at a center of the second hollowed-out region 702.

In step S960, the color resist mask is moved so that the alignment mark 604 aligned with the third mark 603. The alignment mark 604 of the color resist mask is aligned with the third mark 603, and thus positioning of the color resist mask is completed. Then, step S970 is gone to.

In step S970, a third color resist 803 as shown in FIG. 12 and a third color block 706 as shown in FIG. 11 are formed on the black matrix layer by the color resist mask, and a position of the third color resist 803 is checked according to a positional relationship between the third color block 706 and the third hollowed-out region 703.

Specifically, the third color block 706 is formed on the black matrix layer by the pattern of the alignment checking marks of the color resist mask. At the same time, the third color resist 803 is formed on the black matrix layer by the pattern of the color resists of the color resist mask. The position of the third color resist 803 can be checked through observing whether the third color block 706 is positioned at a center of the third hollowed-out region 703. If the position of the third color resist 803 is correct, the third color block 706 formed therein is exactly at a center of the third hollowed-out region 703.

In step S980, the color resist mask is moved so that the alignment mark 604 aligned with the fourth mark 1001. The alignment mark 604 of the color resist mask is aligned with the fourth mark 1001, and thus positioning of the color resist mask is completed. Then, step S990 is gone to.

In step S990, a fourth color resist 1201 as shown in FIG. 12 and a fourth color block 1102 as shown in FIG. 11 are formed on the black matrix layer by the color resist mask, and a position of the fourth color resist 1201 is checked according to a positional relationship between the fourth color block 1102 and the fourth hollowed-out region 1101.

Specifically, the fourth color block 1102 is formed on the black matrix layer by the pattern of the alignment checking marks of the color resist mask. At the same time, the fourth color resist 1201 is formed on the black matrix layer by the pattern of the color resists of the color resist mask. The position of the fourth color resist 1201 can be checked through observing whether the fourth color block 1102 is positioned at a center of the fourth hollowed-out region 1101. If the position of the fourth color resist 1201 is correct, the fourth color block 1102 formed therein is exactly at a center of the fourth hollowed-out region 1101.

According to the present embodiment, the first mark 601 and the second mark 602 are spaced from each other by a first distance; the first mark 601 and the third mark 603 are spaced from each other by a second distance; and the first mark 601 and the fourth mark 1001 are spaced from each other by a third distance. The first hollowed-out region 701 and the second hollowed-out region 702 are spaced from each other by a first distance; the first hollowed-out region 701 and the third hollowed-out region 703 are spaced from each other by a second distance; and the first hollowed-out region 701 and the fourth hollowed-out region 1101 are spaced from each other by a third distance. More importantly, the first distance, the second distance, and the third distance are configured in such a manner that the first color block 704, the second color block 705, the third color block 706, and the fourth color block 1102 do not overlap with one another.

In the method for manufacturing color resist according to the present embodiment, in step S920, step S940, step S960, and step S980, the color resist mask is moved so that the alignment mark 604 is aligned with the first mark 601, the second mark 602, the third mark 603, and the fourth mark 1001 respectively. Therefore, theoretically, the first color block 704 formed in step S930 and the second color block 705 formed in step S950 are spaced from each other by the first distance; the first color block 704 formed in step S930 and the third color block 706 formed in step S970 are spaced from each other by the second distance; and the first color block 704 formed in step S930 and the fourth color block 1102 formed in step S990 are spaced from each other by the third distance. The first distance, the second distance, and the third distance are configured in a reasonable manner so that the first color block 704, the second color block 705, the third color block 706, and the fourth color block 1102 do not overlap with one another while the size of the color blocks does not change.

According to the present embodiment, the first distance, the second distance, and the third distance are configured as follows.

Specifically, the first distance $H_1$ meets $H_1=(4*n_1+1)*P$, $n_1$ being an integer, $n_1 \geqslant 1$ or $n_1 \leqslant -1$, and P being a width of a sub pixel. The second distance $H_2$ meets $H_2=(4*n_2+2)*P$, $n_2$ being an integer, $n_2 \geqslant 0$ or $n_2 \leqslant -2$, and P being a width of a sub pixel. The third distance $H_3$ meets $H_3=(4*n_3+3)*P$, $n_3$ being an integer, $n_3 \geqslant 0$ or $n_3 \leqslant -2$, and P being a width of a sub pixel.

It should be noted that, when $n_1$ is an integer larger than or equal to 1, $n_2$ is an integer larger than or equal to 0, and $n_3$ is an integer larger than or equal to 0, the color resist mask is moved rightwards. When $n_1$ is an integer less than or equal to −1, $n_2$ is an integer less than or equal to −2, and $n_3$ is an integer less than or equal to −2, the color resist mask is moved leftwards.

Specifically, as shown in FIG. 12, when $n_1=1$, $n_2=2$, and $n_3=3$, it can be obtained that $H_1=5*P$, $H_2=10*P$, and $H_3=15*P$. That is, after the color resist mask is initially positioned to form the first color resist 801 and the first color block 704, the color resist mask is moved rightwards from an initial position to the second mark 602 (i.e., the color resist mask is moved rightwards for a distance five times the width of a sub pixel) to form the second color resist 802 and the second color block 705, the color resist mask is moved rightwards from an initial position to the third mark 603 (i.e., the color resist mask is moved rightwards for a distance ten times the width of a sub pixel) to form the third color resist 803 and the third color block 706, and then the color resist mask is moved rightwards from an initial position to the fourth mark 1001 (i.e., the color resist mask is moved rightwards for a distance fifteen times the width of a sub pixel) to form the fourth color resist 1201 and the fourth color block 1102. The first color block 704 and the second color block 705 are spaced from each other by a distance five times the width of a sub pixel; the first color block 704 and the third color block 706 are spaced from each other by a distance ten times the width of a sub pixel;

and the first color block 704 and the fourth color block 1102 are spaced from each other by a distance fifteen times the width of a sub pixel. The first color block 704, the second color block 705, the third color block 706, and the fourth color block 1102 do not overlap with one another.

Preferably, the first color resist 801, the second color resist 802, the third color resist 803, and the fourth color resist 1201 are different from one another, and are respectively one selected from a group consisting of a red color resist, a green color resist, a blue color resist, and a white color resist. For example, the first color resist 801 is a red color resist, the second color resist 802 is a green color resist, the third color resist 803 is a blue color resist, and the fourth color resist 1201 is a white color resist.

Preferably, the first color block 704, the second color block 705, the third color block 706, and the fourth color block 1102 each are arranged at a position between two adjacent sub pixels.

In the method for manufacturing the color resist according to the present embodiment, the mask is moved so that the alignment mark 604 is aligned with the first mark 601, the second mark 602, the third mark 603, and the fourth mark 1001 respectively. The first color resist 801 and the first color block 704 corresponding to the first mark 601, the second color resist 802 and the second color block 705 corresponding to the second mark 602, the third color resist 803 and the third color block 706 corresponding to the third mark 603, and the fourth color resist 1201 and the fourth color block 1102 corresponding to the fourth mark 1001 are formed on the black matrix layer by the mask. The first mark 601 and the second mark 602 are spaced from each other by the first distance; the first mark 601 and the third mark 603 are spaced from each other by the second distance; and the first mark 601 and the fourth mark 1001 are spaced from each other by the third distance. The first distance, the second distance, and the third distance are configured in such a manner that the first color block 704, the second color block 705, the third color block 706, and the fourth color block 1102 do not overlap with one another. In this manner, the color blocks do not overlap with one another while a size thereof does not change, whereby the technical problem in the prior art that the color blocks overlap with each other or there is a peeling off risk for the color blocks can be solved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A method for manufacturing a color resist, comprising steps of:
   forming a black matrix layer on a substrate, wherein the black matrix layer comprises a first mark, a second mark, a third mark, a first hollowed-out region, a second hollowed-out region, and a third hollowed-out region;
   moving a mask so as to enable an alignment mark of the mask to be aligned with the first mark, forming a first color resist and a first color block on the black matrix layer at the same time by the mask, and checking a position of the first color resist according to whether the first color block is positioned at a center of the first hollowed-out region;
   moving the mask so as to enable the alignment mark to be aligned with the second mark, forming a second color resist and a second color block on the black matrix layer at the same time by the mask, and checking a position of the second color resist according to whether the second color block is positioned at a center of the second hollowed-out region; and
   moving the mask so as to enable the alignment mark to be aligned with the third mark, forming a third color resist and a third color block on the black matrix layer at the same time by the mask, and checking a position of the third color resist according to whether the third color block is positioned at a center of the third hollowed-out region, wherein
   the first mark/the first hollowed-out region and the second mark/the second hollowed-out region are spaced from each other by a first distance, and the first mark/the first hollowed-out region and the third mark/the third hollowed-out region are spaced from each other by a second distance;
   the first distance and the second distance are configured in such manner that the first color block, the second color block, and the third color block do not overlap with one another;
   the first distance $H_1$ meets $H_1=(3*n_1+1)*P$, $n_1$ being an integer, $n_1 \geq 1$ or $n_1 \leq -1$, and P being a width of a sub pixel; and
   wherein the second distance $H_2$ meets $H_2=(3*n_2+2)*P$, $n_2$ being an integer, and $n_2 \geq 0$ or $n_2 \leq -2$.

2. The method according to claim 1, wherein the first mark, the second mark, the third mark, the first hollowed-out region, the second hollowed-out region, and the third hollowed-out region are formed simultaneously by one same mask.

3. The method according to claim 2, wherein the first color resist, the second color resist, and the third color resist are different from one another, and are respectively one selected from a group consisting of a red color resist, a green color resist, and a blue color resist.

4. The method according to claim 3, wherein the first color block, the second color block, and the third color block each are arranged at a position between two adjacent sub pixels.

5. The method according to claim 3, wherein the first mark, the second mark, and the third mark are all arranged in a non-active area.

6. The method according to claim 1, wherein the first color resist, the second color resist, and the third color resist are different from one another, and are respectively one selected from a group consisting of a red color resist, a green color resist, and a blue color resist.

7. The method according to claim 6, wherein the first color block, the second color block, and the third color block each are arranged at a position between two adjacent sub pixels.

8. The method according to claim 6, wherein the first mark, the second mark, and the third mark are all arranged in a non-active area.

9. The method according to claim 1, wherein the first color resist, the second color resist, and the third color resist are different from one another, and are respectively one selected from a group consisting of a red color resist, a green color resist, and a blue color resist.

10. The method according to claim 9, wherein the first color block, the second color block, and the third color block each are arranged at a position between two adjacent sub pixels.

11. The method according to claim 9, wherein the first mark, the second mark, and the third mark are all arranged in a non-active area.

12. The method according to claim 1, wherein each of the first hollowed-out region, the second hollowed-out region, and the third hollowed-out region is arranged at a position between two adjacent sub pixels.

13. A method for manufacturing a color resist, comprising steps of:
forming a black matrix layer on a substrate, wherein the black matrix layer comprises a first mark, a second mark, a third mark, a fourth mark, a first hollowed-out region, a second hollowed-out region, a third hollowed-out region
moving a mask so as to enable an alignment mark of the mask to be aligned with the first mark, forming a first color resist and a first color block on the black matrix layer at the same time by the mask, and checking a position of the first color resist according to whether the first color block is positioned at a center of the first hollowed-out region;
moving the mask so as to enable the alignment mark to be aligned with the second mark, forming a second color resist and a second color block on the black matrix layer at the same time by the mask, and checking a position of the second color resist according to whether the second color block is positioned at a center of the second hollowed-out region;
moving the mask so as to enable the alignment mark to be aligned with the third mark, forming a third color resist and a third color block on the black matrix layer at the same time by the mask, and checking a position of the third color resist according to the third color block is positioned at a center of the third hollowed-out region; and
moving the mask so as to enable the alignment mark of the mask to be aligned with the fourth mark, forming a fourth color resist and a fourth color block on the black matrix layer at the same time by the mask, and checking a position of the fourth color resist according to a positional relationship between the fourth color block and the fourth hollowed-out region,
wherein the first mark/the first hollowed-out region and the second mark/the second hollowed-out region are spaced from each other by a first distance, the first mark/the first hollowed-out region and the third mark/the third hollowed-out region are spaced from each other by a second distance, the first mark/the first hollowed-out region and the fourth mark/the fourth hollowed-out region are spaced from each other by a third distance; and wherein the first distance, the second distance, and the third distance are configured in such manner that the first color block, the second color block, the third color block, and the fourth color block do not overlap with one another.

14. The method according to claim 13,
wherein the first distance $H_1$ meets $H_1=(4* n_1+1)*P$, $n_1$ being an integer, $n_1 \geq 1$ or $n_1 \leq -1$, and P being a width of a sub pixel;
wherein the second distance $H_2$ meets $H_2=(4* n_2+2)*P$, $n_2$ being an integer, and $n_2 \geq 0$ or $n_2 \leq -2$; and
wherein the third distance $H_3$ meets $H_3=(4*n_3+3)*P$, $n_3$ being an integer, and $n_2 \geq 0$ or $n_3 \leq -2$.

15. The method according to claim 14, wherein the first color resist, the second color resist, the third color resist, and the fourth color resist are different from one another, and are respectively one selected from a group consisting of a red color resist, a green color resist, a blue color resist, and a white color resist.

16. The method according to claim 14, wherein the first color block, the second color block, the third color block, and the fourth color block each are arranged at a position between two adjacent sub pixels.

17. The method according to claim 13, wherein the first color resist, the second color resist, the third color resist, and the fourth color resist are different from one another, and are respectively one selected from a group consisting of a red color resist, a green color resist, a blue color resist, and a white color resist.

18. The method according to claim 17, wherein the first color block, the second color block, the third color block, and the fourth color block each are arranged at a position between two adjacent sub pixels.

19. The method according to claim 13, wherein the first color block, the second color block, the third color block, and the fourth color block each are arranged at a position between two adjacent sub pixels.

20. The method according to claim 13, wherein each of the first hollowed-out region, the second hollowed-out region, and the third hollowed-out region each is arranged at a position between two adjacent sub pixels.

* * * * *